(12) United States Patent
Skaife

(10) Patent No.: US 9,156,608 B1
(45) Date of Patent: Oct. 13, 2015

(54) PROTECTOR FOR A DISCHARGE SUMP OF A STORAGE BIN

(75) Inventor: Roger Skaife, Janesville, WI (US)

(73) Assignee: R.A. Skaife Enterprises, Inc., Janesville, WI (US)

( * ) Notice: Subject to any disclaimer, the term of this patent is extended or adjusted under 35 U.S.C. 154(b) by 630 days.

(21) Appl. No.: 13/548,313

(22) Filed: Jul. 13, 2012

(51) Int. Cl.
| | |
|---|---|
| B02C 17/02 | (2006.01) |
| B65D 88/54 | (2006.01) |
| B02C 23/00 | (2006.01) |
| B65G 65/40 | (2006.01) |
| B65G 65/46 | (2006.01) |

(52) U.S. Cl.
CPC .............. B65D 88/54 (2013.01); B02C 23/00 (2013.01); B65G 65/40 (2013.01); B65G 65/46 (2013.01)

(58) Field of Classification Search
CPC ........ B65G 65/40; B65G 65/46; B65D 88/54; B02C 23/00
USPC .............. 241/95, 101.2, 101.5, 274; 414/287, 414/306, 309, 310, 311, 321
See application file for complete search history.

(56) References Cited

U.S. PATENT DOCUMENTS

| | | | | |
|---|---|---|---|---|
| 4,264,258 | A * | 4/1981 | Klinge ........................... | 414/309 |
| 4,313,706 | A * | 2/1982 | Danford ........................ | 414/326 |
| 4,314,675 | A | 2/1982 | Grossman | |
| 5,975,447 | A * | 11/1999 | Brusseau ........................ | 241/95 |
| 8,177,470 | B2 * | 5/2012 | Amick et al. .................. | 414/311 |
| 8,789,782 | B1 * | 7/2014 | Blume et al. .................... | 241/95 |
| 8,920,100 | B1 * | 12/2014 | Stahl et al. .................... | 414/326 |
| 2006/0104757 | A1 * | 5/2006 | Schroder et al. .............. | 414/310 |
| 2008/0131242 | A1 | 6/2008 | Duffy et al. | |
| 2010/0239399 | A1 | 9/2010 | Hoogestraat et al. | |
| 2010/0254790 | A1 | 10/2010 | Tkachyk | |
| 2010/0287787 | A1 * | 11/2010 | Shelton et al. .................. | 34/387 |

OTHER PUBLICATIONS

BROCK, Grain Well Discharge Guards—Apr. 2008, Edition BR-2131/0408.*
Beaton Sales, Bin Accessories Sump Saver—Aug. 2014.*
Brock Well-Gard® Discharge Guard, Apr. 2008.
Brock Harvest-Time® Power Sweep, Jan. 2010.
PMC Sump Saver http://sumpsaver.com.

* cited by examiner

*Primary Examiner* — Faye Francis
*Assistant Examiner* — Leonel Vasquez
(74) *Attorney, Agent, or Firm* — Charles S. Sara, Esq.; DeWitt Ross & Stevens SC

(57) ABSTRACT

A sump protector is a multi-tiered structure placed over a discharge sump at the bottom of a storage bin to enhance the flow of materials to the discharge sump while reducing discharge sump blockage. An upper segment includes a bracket for breaking apart clumped materials in the storage bin encountered by materials falling or flowing onto the sump protector from above. A lower segment situated below the upper segment is preferably securable to the floor of a storage bin. The sump protector includes several apertures that can limit the size of materials able to enter the sump protector (and reach the discharge sump). Even if some of the apertures become clogged, other apertures are available to allow materials to continue to flow to the discharge sump. A bottom panel of the lower segment may lack apertures so as to limit the forces exerted on a discharge sump control gate.

19 Claims, 2 Drawing Sheets

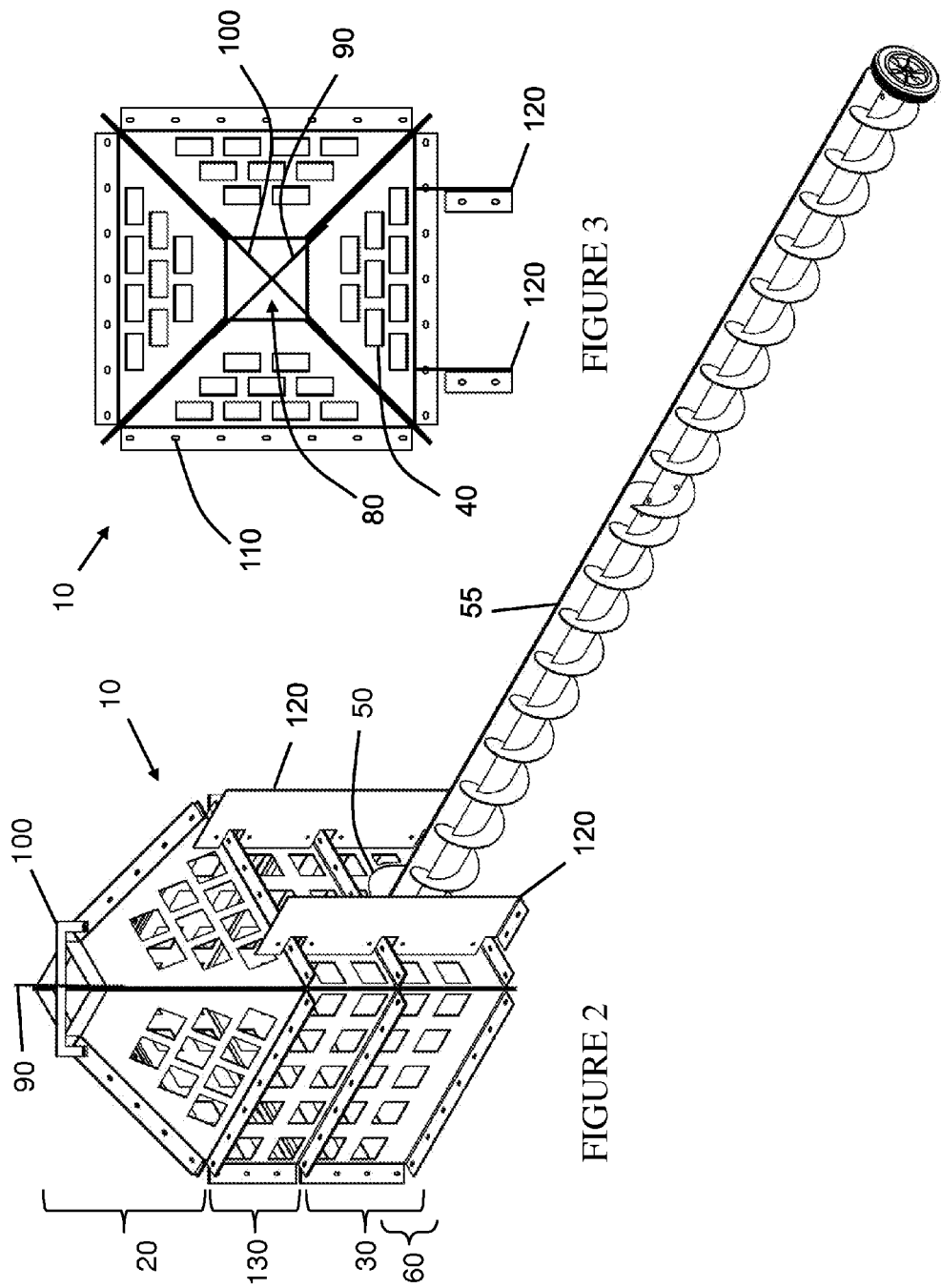

PROTECTOR FOR A DISCHARGE SUMP OF A STORAGE BIN

FIELD OF THE INVENTION

This document concerns an invention relating generally to storage bins with discharge sumps, and more specifically to devices and methods of reducing the likelihood of sump blockage and enhancing the flow of stored materials out of the storage bin.

BACKGROUND OF THE INVENTION

A discharge sump is a collection point for materials stored in a storage bin (such as grain stored in a grain bin). Materials are typically loaded into a storage bin from above, and unloaded through the discharge sump from below. A discharge sump typically includes a control gate for controlling the flow of materials so that the discharge sump is not overloaded.

Because granular materials in the storage bin can clump together (due to, for example, moisture accumulation or changes in temperature), the discharge sump can become blocked. If the discharge sump is fully or partly blocked, materials either cannot be unloaded from the storage bin or the unloading process requires more time because the flow of materials out of the bin slows. What is needed is a device that is able to resist sump blockage and maintain a steadier flow of materials out of the storage bin even if the stored materials clump together.

A sweep auger is a device used to draw (by "sweeping") materials in the storage bin to a centrally-located discharge sump so that the materials can be unloaded from the storage bin. The sweep auger is typically activated when the stored material no longer flows due to gravity but instead remains on the floor of the storage bin. What is needed is a device that is able to reduce sump blockage and is also capable of accommodating a sweep auger so that the sweep auger can remain mounted in the storage bin when the device is installed over the discharge sump.

SUMMARY OF THE INVENTION

The invention, which is defined by the claims set forth at the end of this document, is directed to a sump protector that at least partially alleviates the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring to FIGS. 1 and 2, an exemplary sump protector 10 can be placed over a discharge sump (not pictured) at the bottom of a storage bin used to store, for example, granular food products such as corn, beans, and wheat. The sump protector 10 can be used to surround the discharge sump, forming a sort of protective cage capable of enhancing the flow of materials to the discharge sump while reducing the likelihood of discharge sump blockage. The sump protector 10 may include an upper segment/tier 20 having a means of breaking up or helping granulate clumped materials in the storage bin. The means may include, for example, one or more pointed projections (such as pointed tip 95, discussed below), edges (such as tab 70, discussed below), brackets (such as brackets 90 and 100, discussed below), etc., encountered by materials falling onto the sump protector 10 from above, as further discussed below. A lower segment/tier 30 situated below the upper segment 20 is preferably securable to the floor of a storage bin. The sump protector 10 includes a sidewall having several apertures 40 formed therethrough; in the figures, the sidewall is formed by sides 22, 24, 26, 28, 32, 34, 36, 38, 122, 124, 126, 128, which are further discussed below. The apertures 40 can limit the size of materials able to enter the sump protector 10 (and reach the discharge sump). If some of the apertures 40 of the sump protector 10 become clogged because, for example, clumps of materials become lodged in some of the apertures 40, other apertures 40 would be available to allow materials to continue to flow to the discharge sump. Consequently, the sump protector 10 is able to control the flow of materials by limiting the size of materials able to reach the discharge sump while maintaining flow of materials even if much of the material is lumpy or otherwise unable to pass through some of the apertures 40.

Further advantages and features of the invention will be apparent from the remainder of this document in conjunction with the associated drawings.

BRIEF DESCRIPTION OF THE DRAWINGS

FIG. 2 is a perspective view of the sump protector 10 of FIG. 1 in an assembled form, shown with an auger passageway 50 formed in one side to accommodate a sweep auger 55 installed in the storage bin.

FIG. 3 is a top view of the sump protector 10 of FIGS. 1 and 2.

DETAILED DESCRIPTION OF PREFERRED VERSIONS OF THE INVENTION

Figure 1:
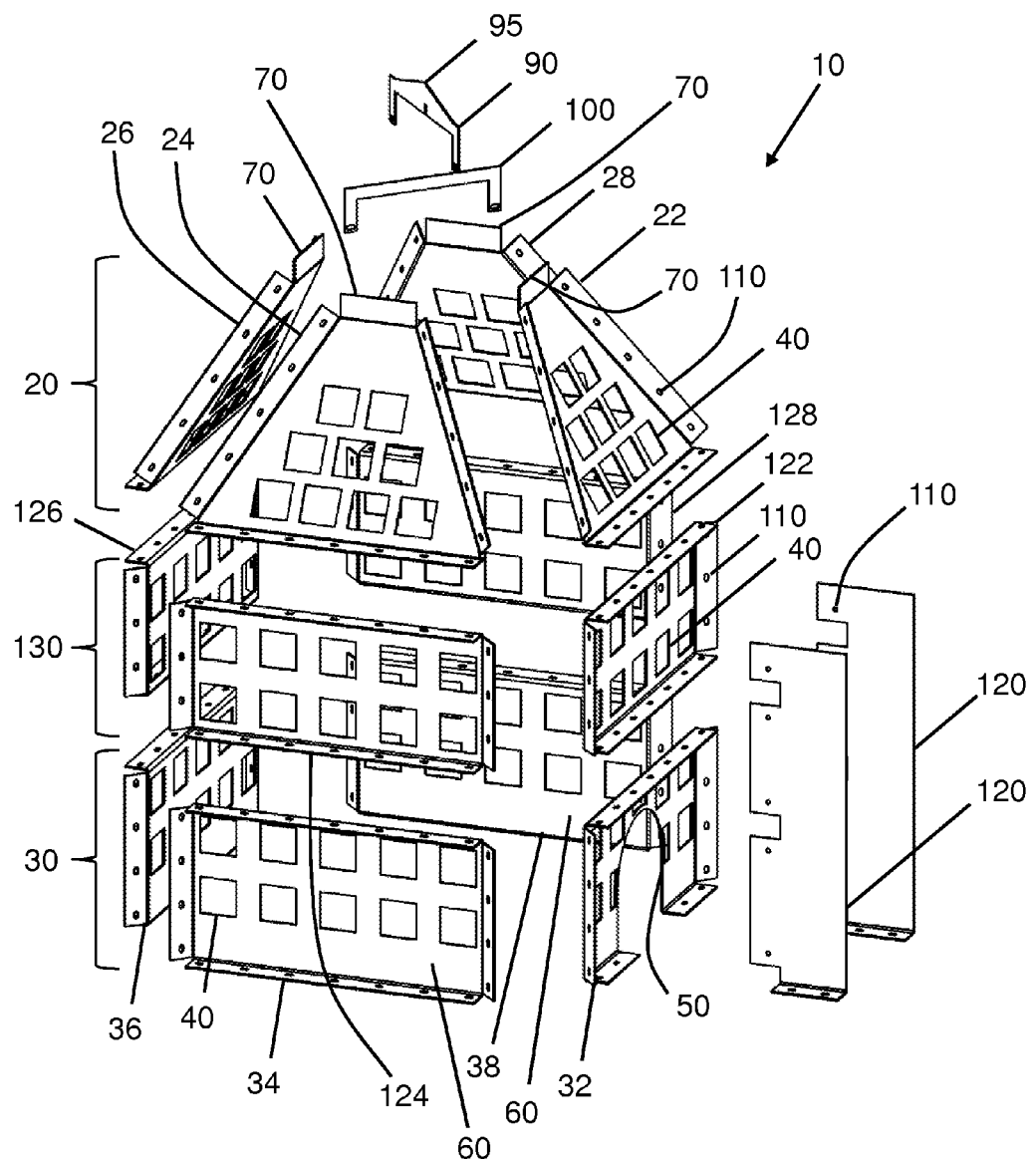
FIG. 1 is an exploded view of an exemplary sump protector 10 in a disassembled form.

Returning to FIGS. 1 and 2, the lower segment 30 of the exemplary sump protector 10 includes lower segment first, second, third, and fourth sides 32, 34, 36, 38. The lower segment first side 32 may optionally include an auger passageway 50 that allows the sump protector 10 to accommodate a sweep auger 55 when installed into a storage bin. This allows the sump protector 10 to be secured inside a storage bin (when the sweep auger 55 is not actively sweeping the bin). Each of the lower segment first, second, third, and fourth sides 32, 34, 36, 38 includes several apertures 40 formed therethrough to allow materials stored in the storage bin to reach the discharge sump enclosed by the sump protector 10. Optionally, the apertures 40 in the lower segment sides 32, 34, 36, 38 have a minimum height from the bottom (of, for example, two to six inches, with a preferred version having a height of three inches), providing a bottom panel 60 without apertures 40. Because the bottom panel 60 without apertures 40 keeps material at the bottom of the storage bin from reaching the discharge sump, the lateral forces experienced by the discharge sump are decreased. With lower forces, the control gate of the discharge sump tends to be easier to open, something that is particularly advantageous with shallower discharge sumps.

The sump protector 10 upper segment 20 includes upper segment first, second, third, and fourth sides 22, 24, 26, 28 secured to each other, each of the upper segment first, second, third and fourth sides 22, 24, 26, 28 including several apertures 40 formed therethrough. The upper segment 20 is tapered so that it is narrower at its top than at its bottom, having a partially pyramidal shape. Each of the upper segment sides 22, 24, 26, 28 terminates in an upwardly extending tab 70, with four tabs 70 meeting to define an upper segment opening 80. Materials falling onto the sump protector 10 may enter the sump protector 10 through the upper segment opening 80. A first U-shaped bracket 90 and a second U-shaped bracket 100 may be positioned at the top of the upper segment 20, forming (for example) an "X" (see FIG. 3) that helps limit the size of objects able to enter the sump protector 10 and helps break up clumps of granular material hitting the sump protector 10 from above. The first U-shaped bracket may include a pointed tip 95 to further help break apart clumped materials.

The sump protector 10 can be brought into a storage bin in a disassembled form (see FIG. 1) to allow the sump protector 10 to enter through smaller bin doors. Once inside the storage bin, the sump protector 10 can be assembled (see FIG. 2) by using fasteners (such as nuts and bolts) extending through fastener openings 110 to secure its sections together and to secure the sump protector 10 to the floor of the storage bin. The sump protector 10 may be positioned over the discharge sump to form a cage-like enclosure about the discharge sump. A pair of stiffener bars or support panels 120 may be secured to the sump protector 10 to structurally reinforce the sump protector 10 so that it is better able to withstand vertical and lateral forces without collapsing or becoming disconnected.

One or more additional segments may be included between the upper and lower segments 20, 30, such as a middle segment/tier 130 as shown in FIGS. 1 and 2. The middle segment 130 includes middle segment first, second, third, and fourth sides 122, 124, 126, 128, each middle segment side 122, 124, 126, 128 having several apertures 40 formed therein. The sump protector 10 can be configured such that access to the discharge sump by materials stored in the storage bin is substantially limited to materials passing through the apertures 40 of the sump protector 10 and through the upper segment opening 80.

A typical square discharge sump with 12-inch sides provides about 144 squared inches of opening through which materials in the storage bin may pass, and a discharge sump with 16-inch sides provides about 256 squared inches of opening. Each aperture 40 of the sump protector 10 may have square cross-sections with three-inch sides (providing 9 squared inches of opening through which materials may pass). If the sump protector 10 includes 120 such apertures 40, the apertures 40 collectively can provide the sump protector 10 with 1080 squared inches of opening (which is about 7.5 times greater than the area provided by the 12-inch square discharge sump alone, or about 4.2 times greater than the area provided by a 16-inch square discharge sump alone). The apertures 40 would allow smaller materials to flow therethrough while blocking clumps that would collectively plug the discharge sump. Even if 80 percent of the 120 apertures 40 (i.e., 864 squared inches of opening) were blocked by clumped materials, there would still remain 216 squared inches of opening (i.e., 1080 minus 864, or 1080 times 0.2) through which granular materials may continue to flow. The granular materials able to pass through the 216 squared inches of openings are small enough to pass through the unblocked apertures 40 and are thus not likely to block the discharge sump. Consequently, granular material can continue to flow through the discharge sump even with substantial clumping of the material in the storage bin. The area can be further increased by (for example) increasing the number of segments/tiers or increasing the number of apertures 40. For example, a five-tiered sump protector 10 with 184 apertures 40 could provide 1,656 squared inches of opening (which is about 11.5 times greater than the area provided by the 12-inch square discharge sump alone, or about 6.5 times greater than the area provided by a 16-inch square discharge sump alone).

The sump protector is preferably made from a metal or metal alloy, hard plastic, or other sturdy material. The height of the sump protector to the pointed tip 95 as shown in the figures may be 44 inches. The height and width of the lower segment 30 may be 13 inches and 24 inches, respectively. The height of the middle segment 130 may be 11 inches. These are dimensions for one version, and substantial deviations from these dimensions may be appropriate based on how the sump protector 10 is to be used.

Initially, it must be kept in mind that the sump protector 10 shown in the accompanying drawings and discussed above are merely exemplary, and may assume a wide variety of configurations different from those noted, and may use components different from those noted.

Various terms referring to orientation and position are used throughout this document. It is to be understood that such terms as "top," "bottom," "forward," "rearward," "left," "right," "upwardly," "downwardly," and the like are words of convenience and are not to be construed as limiting terms.

Various preferred versions of the invention are shown and described above to illustrate different possible features of the invention and the varying ways in which these features may be combined. Apart from combining the different features of the foregoing versions in varying ways, other modifications are also considered to be within the scope of the invention. Following is an exemplary list of such modifications.

First, the number, size, shape, and position of any of the apertures 40 can be adjusted as deemed appropriate. Additionally, the apertures 40 in a sump protector 10 do not necessarily need to have uniform configurations. For example, the apertures 40 formed in the upper segment 20 can be made larger than apertures 40 formed in the lower segment 30 so as to vary the ability of materials to enter the sump protector 10 based where the materials are located relative to the sump protector 10. The apertures 40 may also be shaped so as to help filter or separate materials if materials having a particular shape are preferred over other materials.

Second, the sump protector 10 need not have four sides as shown in the figures but instead may have any number desired. Similarly, the sump protector 10 need not have planar sides meeting at corners but may instead be provided with a cylindrical or otherwise rounded sidewall.

Third, the upper segment 20 of the sump protector 10 need not form an upper segment opening 80. Instead, the upper segment 20 may form a pyramidal or conical pointed tip that does not form a passageway for materials to enter the sump protector 10. The materials falling onto the sump protector 10 and colliding with the pointed tip would be able to slide down the sides of the upper segment 20 and enter the sump protector 10 through the apertures 40. The upper segment 20 may also form spikes or "horns" (analogous to the horns of some animals) with two or more pointed projections extending upwardly from the sump protector 10.

Fourth, the dimensions of the sump protector 10 may be adjusted as deemed appropriate. The sump protector 10 may be, for example, made taller by making the upper and/or lower segments 30, 40 taller, or by adding one or more middle segments 130. The sump protector 10 is thus scalable by adding or subtracting segments/tiers to change based on the size of the storage bin/discharge sump. Adding segments/tiers could also be advantageous by helping enhance material flow by providing additional apertures 40 through which materials may flow even if other apertures 40 become blocked.

Fifth, the sump protector 10 need not be made up of the individual parts shown in FIG. 1. The sump protector 10 may instead (for example) be able to be disassembled into a larger number of parts (allowing the sump protector 10 to fit through smaller spaces when disassembled) or fewer parts (such that less time and effort is required to disassemble and reassemble the sump protector 10).

Sixth, the lower segment 30 may include additional auger passageways 50 to accommodate sumps with multiple sweeps. Similarly, passageways configured to receive other components in storage bins may be provided to accommodate such other components, making the sump protector 10 compatible with other bins and/or bin sweeps.

Seventh, although a pair of support panels 120 is shown in the figures, any number from one to eight (or more) may be incorporated if deemed appropriate. Moreover, although the optional support panels 120 in the figures are situated on one side of the sump protector 10, the pair of support panels 120 may alternatively or additionally be situated on opposing sides of the sump protector 10. For example, one support panel 120 may extend from the second side of the sump protector 10 (i.e., from 34, 124, 24) and another support panel 120 may extend from the fourth side of the sump protector 10 (i.e., from 38, 128, 28).

Eighth, the individual parts of the sump protector 10 need not be secured together using screw fasteners. The parts may (for example) instead be securable to each other using welding, clips, adhesives, etc. Also, the individual parts may be securable by having a portion of one part slide into a complementary portion of another part during assembly, and slide apart during disassembly.

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A sump protector for placement over a discharge sump at the bottom of a storage bin, the sump protector including: a means for breaking up clumped granular materials falling on the sump protector from above; a sidewall with two or more apertures formed therein to allow granular materials to flow there through wherein the sidewall is connected underneath the means for breaking up clumped granular materials, the sidewall having a bottom panel situated below the two or more apertures, the bottom panel: spanning at least 270 degrees about the sump protector; and restricting flow of granular materials relative to flow of granular materials through the sidewall above the bottom panel; wherein the sump protector is configured to: enclose a discharge sump at the bottom of a storage bin; and limit the size of granular materials able to reach the discharge sump so as to reduce discharge sump blockage.

2. The sump protector of claim 1 wherein the means for breaking up clumped granular materials includes a bracket configured to break up clumped granular materials entering the sump protector through the upper segment opening.

3. The sump protector of claim 1 wherein the sump protector is configured such that entry of materials into the sump protector is at least substantially limited to entry through:
   a. the apertures formed in the sidewall of the sump protector; and
   b. an upper segment opening.

4. The sump protector of claim 1 wherein the sump protector is configured to be transportable into a storage bin in a disassembled form and subsequently assembled inside the storage bin.

5. The sump protector of claim 1 wherein the apertures of the sump protector together provide at least 500 squared inches of opening into the sump protector.

6. The sump protector of claim 1 wherein the bottom panel restricts flow of granular materials by having no apertures formed therethrough so as to limit forces exerted by materials stored in the storage bin.

7. The sump protector of claim 1 wherein:
   a. the sidewall includes lower segment first, second, and third sides secured to each other, each of the lower segment first, second, and third sides including at least one aperture formed therethrough, each aperture being entirely surrounded by portions of the sidewall lacking apertures; and
   b. the bottom panel:
      i. extends laterally about at least substantially all of the lower segment first, second, and third sides; and
      ii. is situated below the apertures in the lower segment first, second, and third sides.

8. The sump protector of claim 1 wherein:
   a. the lower segment includes lower segment first, second, third, and fourth sides secured to each other;
   b. the lower segment first side includes an auger passageway formed therein, the auger passageway configured to allow a sweep auger to pass therethrough; and
   c. the bottom panel spans at least substantially entirely around the sump protector except for the auger passageway.

9. The sump protector of claim 1 further including a support panel secured to both the upper and lower segments, the support panel configured to structurally reinforce the sump protector.

10. A sump protector for placement over a discharge sump at the bottom of a storage bin, the sump protector configured to form a cage over a discharge sump, wherein the sump protector includes: an upper segment that is at least substantially tapered, the upper segment having an upper segment bottom portion with a larger diameter than an upper segment top portion; a lower segment secured to the upper segment, the lower segment being configured to be securable to a floor of a storage bin about a discharge sump; and the lower segment with two or more apertures formed therein, each aperture being an opening that is surrounded on all sides by portions of the lower segment lacking apertures; a bracket situated over the upper segment, the bracket configured to break up clamped granules descending into the cage through the upper segment; and the sump protector is configured such when the sump protector is positioned over a discharge sump of a storage bin, access to the discharge sump by materials stored in the storage bin is mostly limited to materials passing through the apertures formed in the lower segment of the sump protector.

11. The sump protector of claim 10 wherein the upper segment further includes an upper segment opening formed at the upper segment top portion, the upper segment opening providing access into the cage from above.

12. The sump protector of claim 10 wherein the lower segment includes two or more apertures formed therethrough, each of the two or more apertures having a minimum height of two inches from a bottom end of the lower segment such that the lower segment includes a lower segment bottom panel at least substantially without apertures formed therein.

13. A sump protector for placement over a discharge sump at the bottom of a storage bin, the sump protector including: an upper segment having upper segment first, second, third, and fourth sides, each of the upper segment first, second, third, and fourth sides having: an at least substantially tapered shape such that the upper segment is at least partly pyramidal when upper segment first, second, third, and fourth sides are secured together; and at least two apertures formed therein; a lower segment having lower segment first, second, third, and fourth sides, wherein: the lower segment is secured below the upper segment; each of the lower segment second, third, and fourth sides includes: at least two apertures formed therein; and a lower segment bottom panel without apertures, the lower segment bottom panel spanning at least 270 degrees about the sump protector; and a bracket situated over the upper segment, the bracket configured to break UP clamped granules descending onto the upper segment.

14. The sump protector of claim 13 wherein:
  a. the upper segment first, second, third, and fourth sides form an upper segment opening; and
  b. the sump protector is configured to at least substantially limit entry therein to entry through:
    i. the apertures; and
    ii. the upper segment opening.

15. The sump protector of claim 13 wherein:
  a. each aperture provides an area between at least substantially 4 squared inches and at least substantially 16 squared inches; and
  b. all apertures of the sump protector together provide at least 1000 squared inches of openings into the sump protector.

16. The sump protector of claim 1 wherein each aperture is surrounded on all sides by portions of the sidewall lacking apertures.

17. The sump protector of claim 1 wherein the bottom panel is situated below all of the apertures of the sidewall such that the bottom panel:
  a. is without apertures;
  b. is positioned at a bottom end of the sump protector; and
  c. extends at least 270 degrees about the sump protector.

18. The sump protector of claim 10 wherein the lower segment further includes a bottom panel extending at least 270 degrees about the sump protector, the bottom panel restricting flow of materials into the sump protector at a bottom end thereof relative to flow through portions of the sidewall situated above the bottom panel.

19. The sump protector of claim 13 wherein each aperture is an opening that is at least substantially entirely surrounded by portions of its corresponding side lacking apertures.

\* \* \* \* \*